(12) United States Patent
Ottino

(10) Patent No.: US 7,712,819 B2
(45) Date of Patent: May 11, 2010

(54) DOOR FOR A MOTOR VEHICLE

(75) Inventor: Franco Giovanni Ottino, S. Giuliano Terme (IT)

(73) Assignee: Intier Automotive Closures S.p.A., Cascine Vica Rivoli (IT)

(*) Notice: Subject to any disclaimer, the term of this patent is extended or adjusted under 35 U.S.C. 154(b) by 527 days.

(21) Appl. No.: 10/561,063

(22) PCT Filed: Jun. 16, 2004

(86) PCT No.: PCT/EP2004/051135

§ 371 (c)(1),
(2), (4) Date: Jul. 13, 2006

(87) PCT Pub. No.: WO2004/110800

PCT Pub. Date: Dec. 23, 2004

(65) Prior Publication Data

US 2007/0107314 A1   May 17, 2007

(30) Foreign Application Priority Data

Jun. 17, 2003   (IT) .......................... TO2003A0455

(51) Int. Cl.
*B60R 1/12* (2006.01)
(52) U.S. Cl. ..................................... 296/152; 296/1.11
(58) Field of Classification Search ............... 296/1.11, 296/146.1, 152; 70/257
See application file for complete search history.

(56) References Cited

U.S. PATENT DOCUMENTS

| 1,652,953 A * | 12/1927 | Patterson ...................... 70/217 |
| 5,316,364 A * | 5/1994 | Ohya ........................ 296/146.5 |
| 6,393,767 B1 * | 5/2002 | Fukumoto et al. ............. 49/503 |
| 6,415,636 B1 * | 7/2002 | Fukumoto et al. ............. 70/208 |

FOREIGN PATENT DOCUMENTS

| DE | 38 44 002 | 12/1988 |
| DE | 93 10 678.5 | 7/1993 |
| FR | 2 760 035 | 2/1997 |

OTHER PUBLICATIONS

Patent Abstracts of Japan Pub. No. 08091125 Pub date: Sep. 4, 1996 Door Lock Interlocking Type Motor-Driven Housing Door Mirror Applicant/ Inventor: Ogiwara.

* cited by examiner

*Primary Examiner*—Glenn Dayoan
*Assistant Examiner*—Melissa A Black
(74) *Attorney, Agent, or Firm*—Clark Hill PLC

(57) ABSTRACT

Described herein is a door for a motor vehicle provided with a supporting framework, supporting means for supporting an external rear-view mirror, a lock, and a key assembly, which is operatively connected to the lock and can be selectively actuated via a control key for disabling/enabling opening of said lock from the outside of the motor vehicle. The key assembly is rigidly fixed to the framework, and is covered, towards the outer side of the door, by the means for supporting the rear-view mirror and is accessible from the outside through a seat made in the supporting means themselves.

5 Claims, 3 Drawing Sheets

DOOR FOR A MOTOR VEHICLE

TECHNICAL FIELD

The present invention relates to a door for a motor vehicle.

BACKGROUND ART

As is known, side doors of motor vehicles generally comprise a supporting framework, which defines, at the top, a window opening closed by a mobile window, when the latter is raised, and, at the bottom, a box-type body, which is open towards the window opening itself and is delimited by an inner wall, facing the inside of the passenger compartment of the motor vehicle, and by an opposite outer wall.

In particular, the inner and outer walls are fixed in a conventional way to the framework of the door, which is consequently set between said walls.

The box-type body delimits a compartment, in which there are usually housed the window, when the latter is lowered, and various components, such as, for example, a lock for closing the door, a key assembly and a window-regulator device.

Normally, the key assembly comprises a casing, basically shaped like a cylindrical cup and fixed to the outer wall of the box-type body of the door, and a key unit, which is also cylindrical, is engaged in an axially fixed position within the casing, is operatively connected to the lock by means of a tie rod or another transmission element, and can be displaced angularly with respect to the casing itself by means of a control key for disabling or enabling opening of the lock from the outside of the motor vehicle (safety function activated and safety function deactivated, respectively).

In particular, the key unit carries a plurality of engagement elements, which are normally pushed by respective springs in a position for coupling with a radial groove of the casing so causing the key unit and the casing itself to be angularly fixed to one another, and can be selectively uncoupled from the aforesaid grooves as a result of the interaction with the external profile of the control key.

The casing is prismatically coupled within a shaped through opening, which is made in the outer wall of the door and has a O-shaped profile, i.e., a profile formed by a portion shaped like an arc of circumference, the opposite ends of which are joined together by a rectilinear stretch.

The casing is moreover provided with an end annular flange, which is set, in use, bearing upon the outer wall of the door in a position corresponding to the inside of the opening and is designed to be fixed axially by means of a U-shaped clip, which is mounted on the side surface of the casing itself and co-operates bearing upon the outer wall of the door on the opposite side of the flange.

Key assemblies of the type described are relatively exposed to breaking. In fact, it is possible, with a screw driver or an elongated implement, to force the key unit to rotate rigidly together with the casing about its own axis, deforming or damaging the outer wall of the door, which is generally of reduced thickness, in an area surrounding the shaped opening, and to obtain deactivation of the safety function of the lock.

Furthermore, since the casing of the key assembly is fixed to the door from the outside of the motor vehicle, it is also possible to insert a screw driver or other similar implements between the end flange of the casing and the outer wall of the box-type body so as to extract the key assembly partially from its seat and thus gain access to the transmission element connecting the key assembly itself to the lock, so deactivating the safety function.

DISCLOSURE OF INVENTION

The purpose of the present invention is to provide a door for a motor vehicle, which will enable, in a simple and economic way, the drawbacks specified above to be overcome.

The aforesaid purpose is achieved by the present invention, in so far as it relates to a door for a motor vehicle having an inner side, which faces, in use, the inside of the motor vehicle itself, and an opposite outer side, said door comprising: a supporting framework; means for supporting an external rear-view mirror; a lock for blocking the door in a closing position; and a key assembly, which is operatively connected to said lock and can be selectively actuated by means of a control key for disabling/enabling opening of said lock from outside the motor vehicle, said key assembly comprising a casing and a key unit, which is housed within said casing, is operatively connected to said lock, and can be displaced with respect to the casing itself by means of said control key; said door being characterized in that said casing of said key assembly is rigidly fixed to said framework, and in that said key assembly is covered, towards the outer side of the door, by said means for supporting said rear-view mirror, and is accessible from outside through a seat made in the supporting means themselves.

BRIEF DESCRIPTION OF THE DRAWINGS

For a better understanding of the present invention, a preferred embodiment thereof is described in what follows, purely by way of non-limiting example and with reference to the annexed drawings, in which.

BEST MODE FOR CARRYING OUT THE INVENTION

Figure 1:
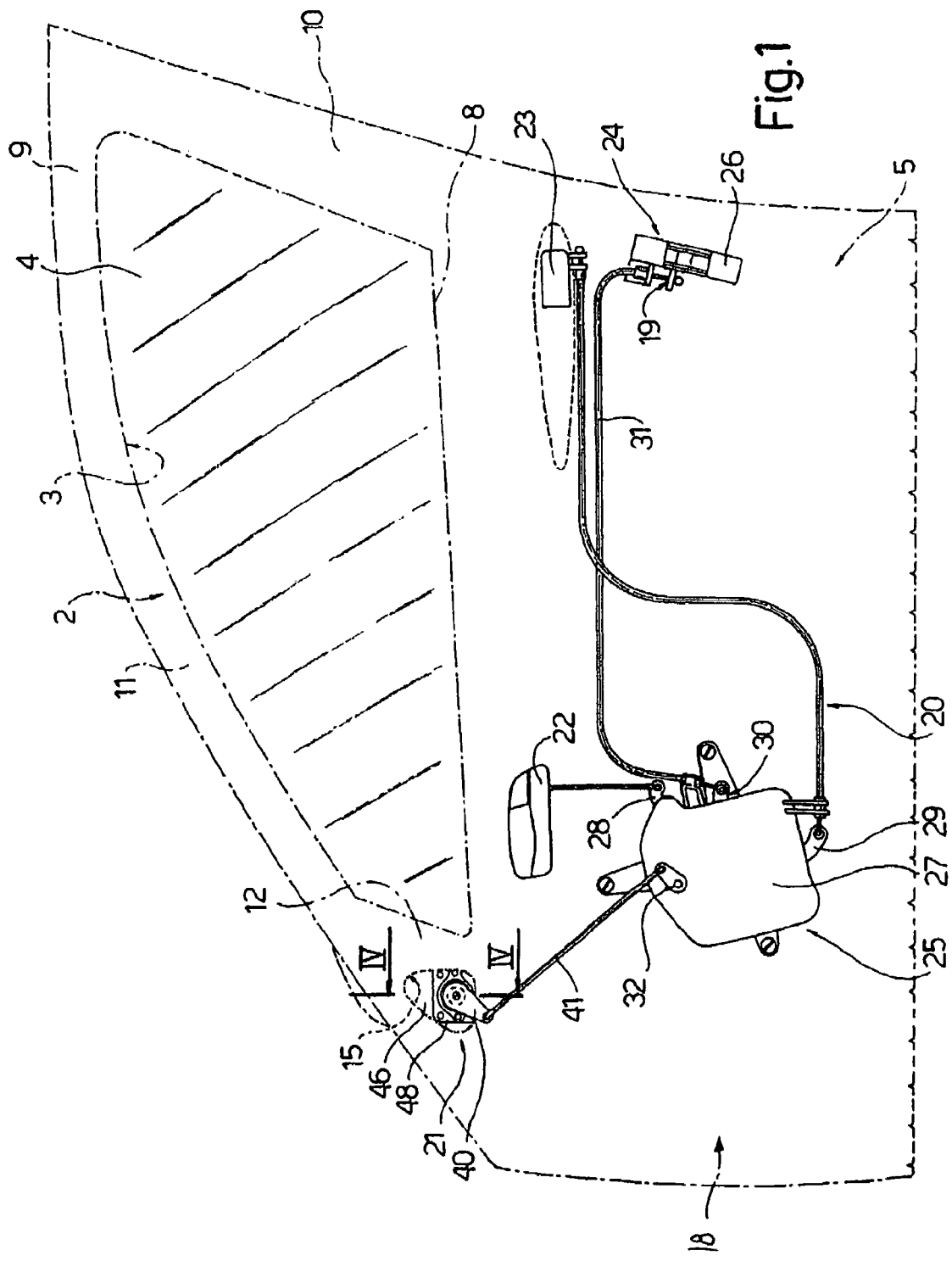
FIG. 1 is a schematic side elevation of a door for a motor vehicle obtained according to the teachings of the present invention and viewed from the side facing the inside of the motor vehicle itself.
Figure 2:
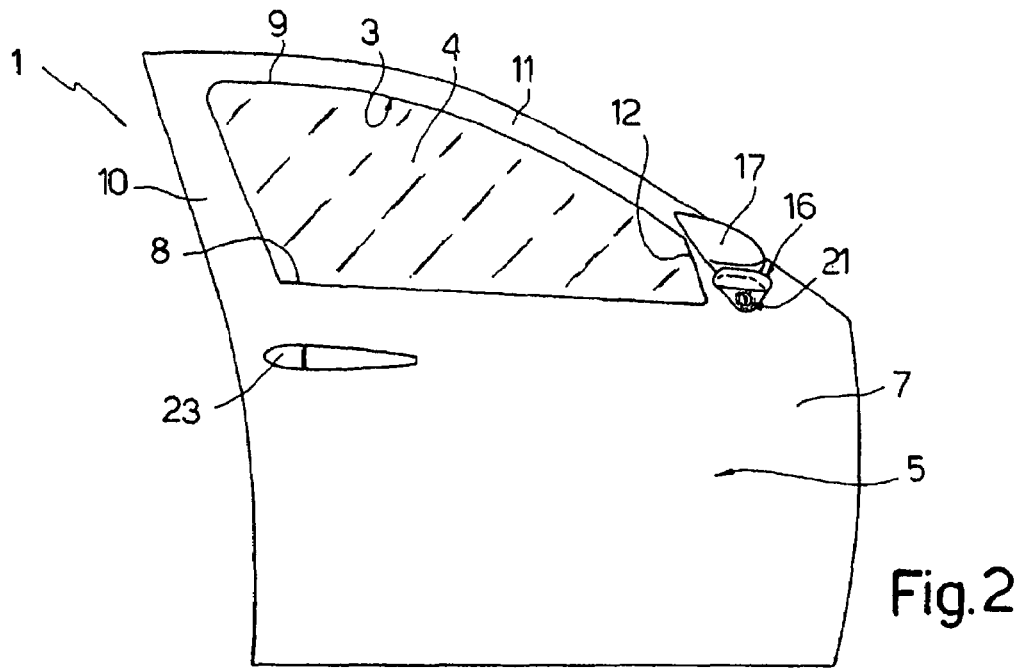
FIG. 2 is a side elevation at a reduced scale of the door of FIG. 1 viewed from the side facing the outside of the motor vehicle.

With reference to FIGS. 1 and 2, designated as a whole by 1 is a door for a motor vehicle, in particular of the type having a front side hinged to the body of the motor vehicle itself.

The door 1 comprises a supporting framework 2 (which can be seen in greater detail in FIGS. 3 and 4), which defines, at the top, a window opening 3 closed by a mobile window 4, when the latter is raised, and, at the bottom, a box-type body 5, which is open towards the window opening 3 itself and is delimited by an inner wall 6, facing the inside of the motor vehicle, and by an opposite outer wall 7.

In particular, the window opening 3 is delimited by a horizontal bottom cross member 8, from which there extends the box-type body 5, by a top cross member 9, which is parallel to the cross member 8 and has a smaller length than does the latter, by a rear vertical upright 10 defining the side of opening of the door 1, and by an oblique front upright 11, which is set opposite to the upright 10 and connects one end of the cross member 8 to one end of the cross member 9.

The framework 2 moreover comprises a further upright 12, which faces the upright 10 and is parallel thereto and extends between the upright 11 and the cross member 8 in a position set at a distance from the area of connection between the upright 11 and the cross member 8 themselves. The upright 12, hence, delimits on one side the window opening 3 for housing the window 4, and on the opposite side a through opening 15 having a basically triangular profile, covered towards the outside by a supporting element 16, typically made of plastic material, constrained to which, in a conventional way and not illustrated, is an external rear-view mirror 17.

The framework 2 is formed at the bottom by a basically rectangular frame, which extends from the cross member 8 and on which there are fixed the inner and outer walls 6, 7 of the box-type body 5.

Figure 4:
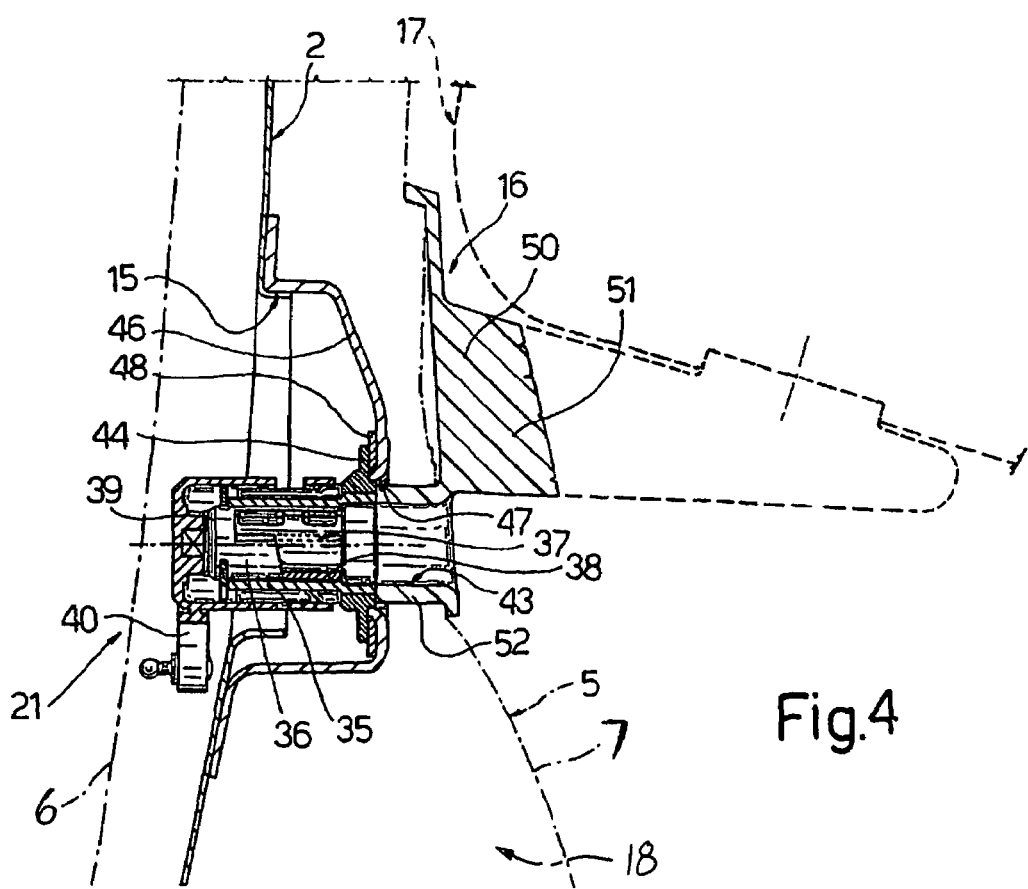
FIG. 4 is an enlarged cross-sectional view according to the line IV-IV of the detail illustrated in FIG. 3.

As may be noted from FIGS. 1 and 4, the box-type body 5 delimits a compartment 18, in which there are usually housed the window 4, when this is lowered, and various components, such as, for example, a lock 20 for closing the door 1 and a key assembly 21.

To the inner and outer walls 6, 7 of the box-type body 5 there are moreover fixed, in a conventional way, respective handles 22, 23 for opening the door 1, which are operatively connected to the lock 20.

The lock 20, which is only partially visible in FIG. 1, is of the type illustrated and described in the international patent application WO 03/033847, the contents of which are considered incorporated herein by way of reference.

In particular, the lock 20 is designed to interact with a lock striker (not illustrated) fixed to an upright of the door 1 and basically comprises a closing module 24 and a control module 25, which are operatively connected to one another and are housed on the door 1 itself in remote positions.

The closing module 24 comprises a box-type supporting body 26 housed within the compartment 18 of the door 1, and a closing mechanism 19 (only slightly visible in the attached figures but illustrated in detail in FIGS. 3 and 4 of the patent application WO 03/033847), which is carried by the supporting body 26 and is designed to couple in a releasable way with the aforementioned lock striker for bringing about closing of the door 1.

The control module 25 comprises a supporting body 27, which is also housed within the compartment 18 of the door 1, constrained to which are, in the way illustrated in detail in FIGS. 5 and 6 of the patent application WO 03/033847: an internal-control lever 28 connected to the handle 22; an external-control lever 29 connected to the handle 23; an actuation mechanism 30 (only slightly visible in FIG. 1), which is controlled by the internal-control and external-control levers 28, 29 and is connected by means of a flexible-cable transmission 31 of the Bowden type to the closing mechanism 19, for bringing about release from the lock striker following upon actuation of the handles 22, 23 themselves; and a safety mechanism 32 (only partially illustrated in FIG. 1) for disabling/enabling opening of the lock 20 from outside (safety function activated and safety function deactivated, respectively), which is operatively connected to the key assembly 21.

Figure 3:
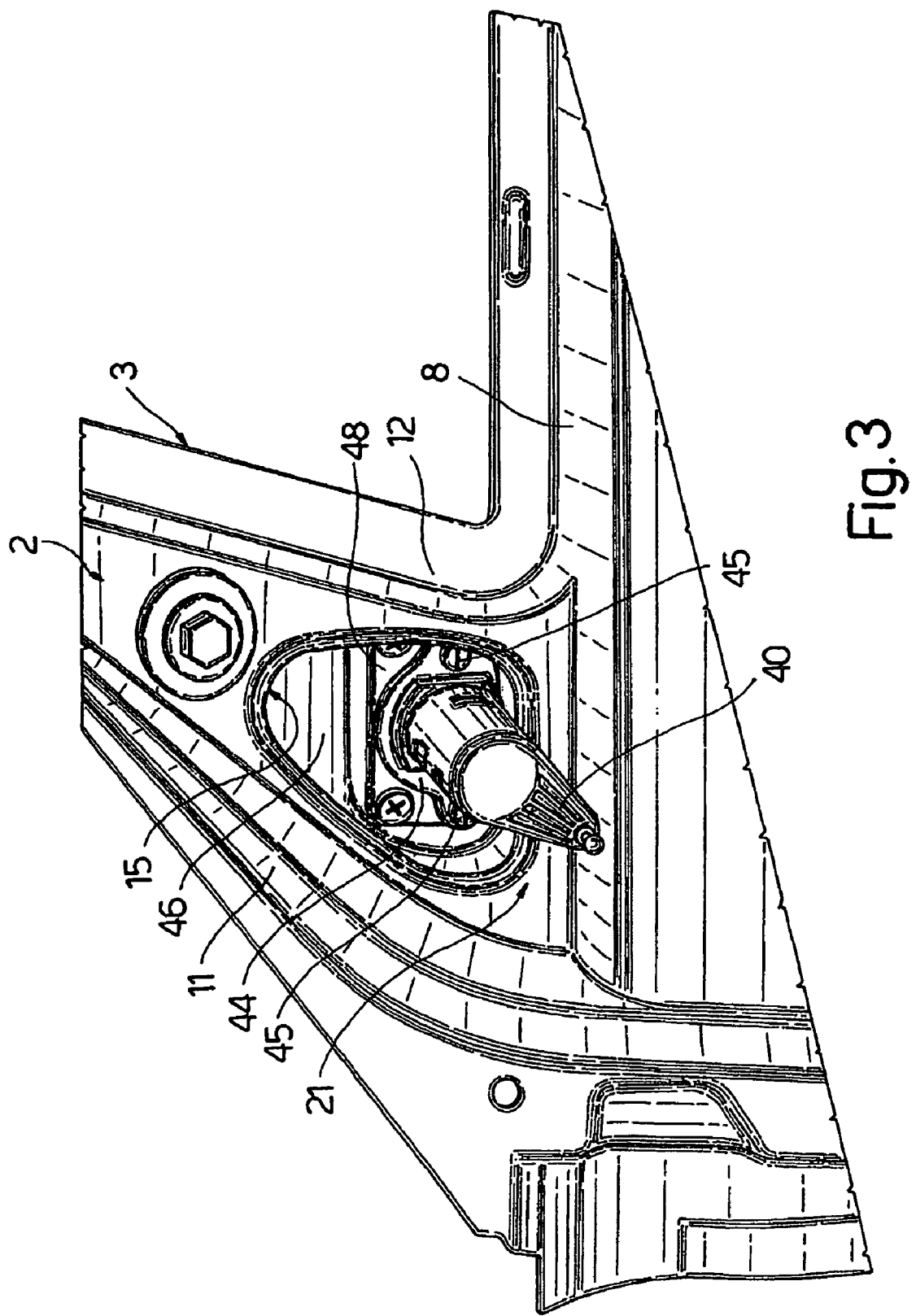
FIG. 3 is a perspective view at an enlarged scale of a detail of FIG. 1.

With reference to FIGS. 1, 3 and 4, the key assembly 21 comprises a cylindrical-sleeve casing 35 fixed to the door 1, and a key unit 36, which is also cylindrical, is engaged in a position axially fixed within the casing 35, is operatively connected to the safety mechanism 32 of the control module 25 of the lock 20, and can be displaced angularly with respect to the casing 35 itself by means of a control key (of a known type and not illustrated) for activating/deactivating the safety function of the lock 20.

In particular, the key unit 36 defines a seat 37 for engagement of the control key, which is accessible in an area corresponding to an end 38 thereof facing outwards, and carries, in a way known and not illustrated, a plurality of engagement elements, which are normally pushed by respective springs into a position for coupling with the casing 35 so that the key unit 36 and the casing 35 itself are angularly fixed to one another; the aforesaid engagement elements can be selectively uncoupled from the casing 35 as a result of the interaction with the external profile of the control key.

The key unit 36 moreover fixedly carries, in an area corresponding to an end 39 thereof opposite to the end 38, a radial arm 40 having a free end constrained, via a tie rod 41, to the safety mechanism 32.

According to an important characteristic of the present invention, the casing 35 is housed through an opening 15 of the framework 2, is rigidly fixed to the framework 2 itself, and is accessible from the outside of the motor vehicle through a seat 43 made in the supporting element 16.

In particular, the casing 35 fixedly carries, in a position corresponding to the end thereof facing the outer side of the door 1, a peripheral flange 44 fixed by means of screws 45 to an attachment element 46, which is set so as to close the opening 15 and is, in turn, provided with a through hole 47 for enabling access to the key unit 36.

More precisely, the attachment element 46 has a half-shell conformation, can be made either of material plastic or of metal material, and is fixed peripherally to the framework 2 in an area surrounding the opening 15.

In practice, the attachment element 46 is set between the opening 15 of the framework 2 and the supporting element 16 for supporting the rear-view mirror 17.

As may be seen in detail in FIGS. 3 and 4, the flange 44 of the casing 35 is fixed, preferably via interposition of a metal reinforcement plate 48, to a face of the attachment element 46 facing the inner wall 6 of the door 1.

The supporting element 16 is formed integrally by a base plate 50 applied externally on the door 1 and defining the seat 43 for access to the key assembly 21, and an arm 51 for attachment of the rear-view mirror 17, which extends in cantilever fashion from the base plate 50.

In greater detail, the seat 43 is delimited by a cylindrical sleeve 52 extending integrally in cantilever fashion from the base plate 50 in a direction opposite with respect to the arm 51, i.e., towards the inner side of the door 1.

Advantageously, the sleeve 52 engages the hole 47 of the attachment element 46 and co-operates head-on, in an area corresponding to the free end thereof, with the end of the casing 35 facing the outer side of the door 1 so as to prevent access, from the outside of the motor vehicle, to the area for fixing of the casing 35 itself to the attachment element 46.

From an examination of the characteristics of the door 1 made according to the teachings of the present invention, the advantages that the latter enables emerge clearly.

In particular, since the key assembly 21 is rigidly fixed to the framework 2 in a position in which it is covered externally by the supporting element 16 of the rear-view mirror 17 and is accessible from the outside only through a seat 43 made in the supporting element 16 itself, breaking of the lock 20 via rigid rotation of the key assembly 21, obtained by forcing the rotation of the key unit 36 with the casing 35 by means of an elongated implement activated in the seat 37, is prevented.

Furthermore, since the key assembly 21 is fixed to the framework 2 from the inner side of the door 1, any attempt to extract the key assembly 21 itself partially from outside in order to gain access to the control elements of the safety mechanism 32 (tie rod 41) is prevented.

Finally, the solution described and illustrated herein is particularly simple and economic, in so far as it does not entail any modification of the structure and of the configuration of traditional doors, but simply exploits a through opening 15, normally present in the doors themselves, and an element 16 for supporting the rear-view mirror 17, which is also normally used to cover the aforesaid opening towards the outside.

It is clear that modifications and variations may be made to the door 1 described and illustrated herein, without thereby departing from the field of protection of the present invention.

In particular, if the element adopted on the motor vehicle for supporting the rear-view mirror is made of metal material, the casing 35 of the key assembly 21 could be fixed directly to said element without any need to use an additional attachment element. In this case, the casing 35 would be rigidly constrained to the framework 2 by means of the mirror-supporting element instead of by the attachment element 46.

In addition, the key assembly 21 could also be connected to locks of a type different from the one described and illustrated herein, for example, the lock may be made of a single block, which includes both the mechanism for interaction with the lock striker and the control assembly.

The invention claimed is:

1. A door for a motor vehicle comprising:
    a supporting framework including an inner side, an opposite outer side, and a through opening between said inner and outer sides;
    a supporting element fixedly secured to said outer side of said supporting framework, said supporting element including a cylindrical sleeve defining a seat;
    a rear-view mirror secured to said supporting element;
    an attachment element fixedly connected to said supporting framework between said supporting element and said through opening;
    a lock for blocking said door in a closing position; and
    a key assembly operatively connected to said lock and selectively actuated for disabling/enabling opening of said lock from outside the motor vehicle, said key assembly including a casing having a peripheral flange fixed to a face of said attachment element on a side of said attachment element facing towards said inner side of said door and wherein said casing and a key unit are set apart inwardly from an immediately surrounding portion of said supporting framework, said key assembly is covered towards said supporting framework by said supporting element and is accessible from outside the motor vehicle through said seat, wherein said cylindrical sleeve of said supporting element abuts and substantially entirely covers an outwardly facing end of said casing.

2. A door as set forth in claim 1 wherein said key assembly is accessible from outside the motor vehicle without moving said rear-view mirror from a use position.

3. A door as set forth in claim 2 wherein said cylindrical sleeve of said supporting element abuts an end of said casing directly adjacent said peripheral flange.

4. A door as set forth in claim 3 further including a reinforcement element disposed between said peripheral flange of said casing and said face of said attachment element.

5. A door for a motor vehicle comprising:
    a supporting framework including an inner side, an opposite outer side, and a through opening located between said inner and outer sides;
    a supporting element fixedly secured to said outer side of said supporting framework, said supporting element including a cylindrical sleeve defining a seat, said cylindrical sleeve extending through said outer side of said supporting framework toward said inner side thereof;
    a rear-view mirror secured to said supporting element;
    an attachment element fixedly connected to said supporting framework and disposed between said supporting element and said through opening, said attachment element having a through hole;
    a lock for blocking said door in a closing position; and
    a key assembly operatively connected to said lock and selectively actuated for disabling/enabling opening of said lock from outside the motor vehicle, said key assembly including a casing and a key unit, said casing having a peripheral flange fixed to a face of said attachment element on a side of said attachment element facing towards said inner side of said door to prevent rotation of said casing, said key unit housed within said casing and displaceable with respect to said casing, wherein said casing and said key unit are set apart inwardly from an immediately surrounding portion of said supporting framework and said key assembly is covered towards said supporting framework by said supporting element and is accessible from outside the motor vehicle through said seat without moving said rear-view mirror from a use position, and wherein said cylindrical sleeve of said supporting element extends into said through hole of said attachment element and abuts and substantially entirely covers an outwardly facing end of said casing directly adjacent said peripheral flange.

* * * * *